US010979339B2

(12) United States Patent
Kananda et al.

(10) Patent No.: US 10,979,339 B2
(45) Date of Patent: *Apr. 13, 2021

(54) NODE REPRESENTATIONS OF PACKET FORWARDING PATH ELEMENTS

(71) Applicant: Juniper Networks, Inc., Sunnyvale, CA (US)

(72) Inventors: Swamy Sadashivaiah Renu Kananda, Sunnyvale, CA (US); Nitin Kumar, Fremont, CA (US); Scott Mackie, Santa Cruz, CA (US); Surya Chandra Sekhar Nimmagadda, San Ramon, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/673,704

(22) Filed: Nov. 4, 2019

(65) Prior Publication Data
US 2020/0067813 A1 Feb. 27, 2020

Related U.S. Application Data

(63) Continuation of application No. 15/870,309, filed on Jan. 12, 2018, now Pat. No. 10,469,357.

(51) Int. Cl.
*H04L 12/751* (2013.01)
*H04L 12/721* (2013.01)
(Continued)

(52) U.S. Cl.
CPC .............. *H04L 45/02* (2013.01); *H04L 45/38* (2013.01); *H04L 45/64* (2013.01); *H04L 67/42* (2013.01)

(58) Field of Classification Search
CPC .......... H04L 45/02; H04L 67/42; H04L 12/56
See application file for complete search history.

(56) References Cited

U.S. PATENT DOCUMENTS 5,206,856 A * 4/1993 Chung .................... H04L 45/00
370/400
6,188,675 B1 2/2001 Casper et al.
(Continued)

FOREIGN PATENT DOCUMENTS

CN 101686200 A 3/2010
CN 104012063 A 8/2014
(Continued)

OTHER PUBLICATIONS

Chen, Johnny, Peter Druschel, and Devika Subramanian. "An efficient multipath forwarding method." Proceedings. IEEE INFOCOM '98, the Conference on Computer Communications. IEEE Computer and Communications Societies. Gateway to the 21st Century (Cat. No. 98. vol. 3 1998) (Year: 1998).*

(Continued)

*Primary Examiner* — Sharad Rampuria
(74) *Attorney, Agent, or Firm* — Shumaker & Sieffert, P.A.

(57) ABSTRACT

In one example, a method comprises receiving, by a forwarding manager for an internal forwarding path executed by at least one packet processor of a forwarding unit of a network device, one or more packet processing operations from a control unit of the network device; generating, by the forwarding manager based on the one or more packet processing operations, a plurality of nodes each comprising a unique token, wherein a first node of the plurality of nodes includes a token reference set to a value for the token of a second node of the plurality of nodes; configuring, by the forwarding manager based on the nodes, the forwarding path to include respective forwarding path elements for the (Continued)

plurality of nodes; and processing, by the packet processor, a packet received by the forwarding unit by executing the forwarding path elements.

20 Claims, 5 Drawing Sheets

(51) Int. Cl.
*H04L 12/715* (2013.01)
*H04L 29/06* (2006.01)

(56) References Cited

U.S. PATENT DOCUMENTS

| | | | |
|---|---|---|---|
| 7,215,637 B1* | 5/2007 | Ferguson | H04L 45/00 370/230.1 |
| 7,990,993 B1* | 8/2011 | Ghosh | H04L 45/025 370/428 |
| 8,806,058 B1 | 8/2014 | Mackie et al. | |
| 9,843,624 B1* | 12/2017 | Taaghol | H04L 41/0803 |
| 9,860,168 B1 | 1/2018 | Seshadri | |
| 10,237,176 B2 | 3/2019 | Mutnuru et al. | |
| 10,469,357 B2 | 11/2019 | Kananda et al. | |
| 10,536,375 B2 | 1/2020 | Nimmagadda et al. | |
| 2008/0044181 A1 | 2/2008 | Sindhu | |
| 2008/0151893 A1 | 6/2008 | Nordmark et al. | |
| 2013/0163475 A1 | 6/2013 | Beliveau et al. | |
| 2013/0223442 A1 | 8/2013 | Narayanan et al. | |
| 2015/0195162 A1 | 7/2015 | Gandham | |
| 2016/0006799 A1 | 1/2016 | Khandelwal | |
| 2016/0182542 A1 | 6/2016 | Staniford | |
| 2017/0142031 A1* | 5/2017 | Mackie | H04L 45/72 |

FOREIGN PATENT DOCUMENTS

| | | |
|---|---|---|
| CN | 107070674 A | 8/2017 |
| CN | 107566440 A | 1/2018 |
| EP | 3057265 A1 | 2/2015 |
| WO | 2016/125116 A1 | 8/2016 |
| WO | 2017132271 A1 | 8/2017 |

OTHER PUBLICATIONS

Examination Report from counterpart European Application No. 18203655.8, dated Mar. 17, 2020, 6 pp.
First Office Action and Search Report, and translation thereof, from counterpart Chinese Application No. 201811284590.X, dated Mar. 3, 2020, 14 pp.
Extended Search Report from counterpart European Application No. 18203655.8, dated Apr. 18, 2019, 9 pp.
Kreutz et al., "Towards Secure and Dependable Software-Defined Networks," HotSDN'13 Proceedings of the Second ACM SIGCOMM workshop on Hot topics in software defined networking, Aug. 16, 2013, 6 pp.
Prosecution History from U.S. Appl. No. 15/870,309, dated Mar. 12, 2019 through Jun. 25, 2019, 34 pp.
Prosecution History from U.S. Appl. No. 15/870,148, dated May 29, 2019 through Sep. 12, 2019, 43 pp.
"Advance Forwarding Interface (AFI)," Juniper Networks, May 17, 2017, 24 pp.
Sodhi, "'Advance Forwarding Interface' Data Model for Data Plane Programmability," ACM SIGCOMM 2018 Industrial Demos, Aug. 20, 2018, 2 pp.
Nscsekhar, "Industry Solutions and Trends" dated Jul. 27, 2017, Retrieved from: <https://forums.juniper.net/t5/industry-Solutions-and-Trends/Juniper-Forwarding-Interface/ba-p/310823>, accessed Feb. 25, 2020, 12 pp.
Response to Extended Search Report dated Apr. 18, 2019 from counterpart European Application No. 18203655.8, filed Jan. 16, 2020, 16 pp.
Response to Examination Report dated Mar. 17, 2020 from counterpart European Application No. 18203655.8, filed Jul. 13, 2020, 15 pp.
Examination Report from counterpart European Application No. 18203655.8, dated Oct. 22, 2020, 5 pp.
Second Office Action and Search Report, and translation thereof, from counterpart Chinese Application No. 201811284590.X, dated Nov. 2, 2020, 6 pp.
Response to Examination Report dated Oct. 22, 2020, from counterpart European Application No. 18203655.8, filed Dec. 16, 2020, 8 pp.

* cited by examiner

NODE REPRESENTATIONS OF PACKET FORWARDING PATH ELEMENTS

This application is a continuation of U.S. patent application Ser. No. 15/870,309, filed Jan. 12, 2018, the entire contents of which is incorporated herein by reference.

TECHNICAL FIELD

The disclosure relates to packet-based computer networks and, more particularly, to processing packets within network devices.

BACKGROUND

A computer network is a collection of interconnected computing devices that can exchange data and share resources. Example network devices include layer two devices that operate within the second layer of the Open Systems Interconnection (OSI) reference model, i.e., the data link layer, and layer three devices that operate within the third layer of the OSI reference model, i.e., the network layer. Network devices within computer networks often include a control unit that provides control plane functionality for the network device and one or more forwarding units for routing or switching data units, e.g., packets. In some cases, for example, a network device may include a plurality of packet processors and a switch fabric that collectively provide a forwarding plane for forwarding network traffic.

The control plane functionality provided by the network device include storing network topologies in the form of a routing information base (RIB), executing routing protocols to communicate with peer routing devices to maintain and update the RIB, and providing a management interface to allow user access and configuration of the network device. The control unit maintains routing information that represents the overall topology of the network and defines routes to destination prefixes within the network.

The control unit derives a forwarding information base (FIB) that defines forwarding path elements for packet lookup and other processing operations to be performed by the forwarding units, the FIB being generated by the control unit in accordance with the routing information and control information. The control unit installs the FIB within the forwarding plane to programmatically configure the forwarding units. The representation of the FIB stored to forwarding units may be referred to as the hardware FIB.

The data and instructions that constitute the forwarding path elements may be connected and arranged into a forwarding topology that defines an internal forwarding path for each incoming packet received by the network device. For example, to generate a route table lookup forwarding path element, the control unit selects routes defined by the network topology and maps packet key information (e.g., destination information and other select information from a packet header) to one or more specific next hop network devices and ultimately to one or more specific output interfaces of interface cards of the network device. In some cases, the control unit may install the forwarding path element into each of the forwarding units to update the FIB within each of the forwarding units and control traffic forwarding within the forwarding plane. For a given packet, a forwarding unit executes the forwarding path elements as defined by the internal forwarding path of the forwarding unit for the packet to perform the actions defined and configured by the control unit within the forwarding unit. Bifurcating control and forwarding plane functionality allows the FIB in each of forwarding units to be updated without degrading packet forwarding performance of the network device.

SUMMARY

In general, the disclosure describes techniques for representing forwarding path elements of a network device forwarding plane using element nodes. In some examples, the element nodes include corresponding, identifying tokens that are usable for connecting the element nodes and the corresponding forwarding path elements into forwarding topologies for an internal packet forwarding path of forwarding units that make up the network device forwarding plane. The element nodes (hereinafter, "nodes") may represent different types of forwarding path elements, such as simple actions (e.g., counters, policers, discards) and conditionals to complex constructs such as tables, trees, and lookups. A token for a node is a value that uniquely identifies the node and the represented forwarding path element. A network device may use a token as a unique reference for specifying a next (or downstream) node for a node or entry of a lookup-type node within a forwarding path.

For example, a network device forwarding unit may execute a server module that offers programmatic access to its internal forwarding path. The server module exposes an interface that enables clients of the server module to configure the internal forwarding path with forwarding path elements by requesting new nodes from the server module and then specifying, to the server module, the connections among the new nodes using the node tokens as references. One or more clients of the server module program the underlying forwarding path by describing the forwarding path in terms of nodes and entries, where each node and entry can have one or more dependencies that are relationships to other nodes referred to by the nodes' respective and unique tokens. Using node tokens and token references, the server module may manage node and entry dependencies and update dependencies when a node is changed by a client.

The techniques may provide one or more advantages. For example, representing forwarding path elements of internal forwarding paths of network device forwarding units using nodes having uniquely identifying tokens may enable programmatic modules executing on the forwarding units to specifying dependencies among the forwarding path elements to create packet forwarding topologies using the corresponding token values. This may enable such programmatic modules, e.g., the server module and one or more clients, to communicate across process and memory boundaries while reducing translation of memory values for forwarding path elements, in comparison to, e.g., a pointer-based reference scheme. The techniques may also provide clients and third-party applications with direct programmatic access to at least a portion of the forwarding path of the network device. For instance, using nodes, clients and third-party applications may configure, remove, and alter the state of forwarding path elements independently of the network device forwarding information base (FIB). Still further in some examples, the techniques may provide an interface for managing different forwarding path elements, such as routes, firewalls, and encapsulations. The techniques may also or alternatively provide one or more of the following advantages, such as easing dependency management and providing a platform for handling dependencies among the forwarding path elements, providing efficient triaging and visualization of the forwarding topology, and providing graceful error handling for missing dependencies and out of order messages.

In one example, a method comprises receiving, by a forwarding manager for an internal forwarding path executed by at least one packet processor of a forwarding unit of a network device, one or more packet processing operations from a control unit of the network device; generating, by the forwarding manager based on the one or more packet processing operations, a plurality of nodes each comprising a unique token, wherein a first node of the plurality of nodes includes a token reference set to a value for the token of a second node of the plurality of nodes; configuring, by the forwarding manager based on the nodes, the forwarding path to include respective forwarding path elements for the plurality of nodes; and processing, by the at least one packet processor, a packet received by the forwarding unit by executing the forwarding path elements.

In one example, a network device comprises a control unit configured to execute at least one application; and a forwarding unit comprising: an interface card configured to receive packets; at least one packet processor operably coupled to a memory; an internal forwarding path, wherein at least a portion of the forwarding path is stored to the memory and is executable by the at least one packet processor; a forwarding unit processor; and a forwarding manager configured for execution by the forwarding unit processor, wherein the forwarding manager is configured to receive one or more packet processing operations, wherein the forwarding manager is configured to generate, based on the one or more packet processing operations, a plurality of nodes each comprising a unique token, wherein a first node of the nodes includes a token reference set to a value for the token of a second node of the nodes, wherein the forwarding manager is configured to configure, based on the nodes, the forwarding path to include respective forwarding path elements for the nodes, and wherein the at least one packet processor is configured to process the packets received by the forwarding unit by executing the forwarding path elements.

In one example, a non-transitory computer-readable medium comprises instructions for causing one or more programmable processors and at least one packet processor of a forwarding unit of a network device to: receive, by a forwarding manager for an internal forwarding path executed by the at least one packet processor, one or more packet processing operations from a control unit of the network device; generate, by the forwarding manager based on the one or more packet processing operations, a plurality of nodes each comprising a unique token, wherein a first node of the plurality of nodes includes a token reference set to a value for the token of a second node of the plurality of nodes; configure, by the forwarding manager based on the nodes, the forwarding path to include respective forwarding path elements for the plurality of nodes; and process, by the at least one packet processor, a packet received by the forwarding unit by executing the forwarding path elements.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

Like reference characters denote like elements throughout the figures and text.

DETAILED DESCRIPTION

Figure 1:
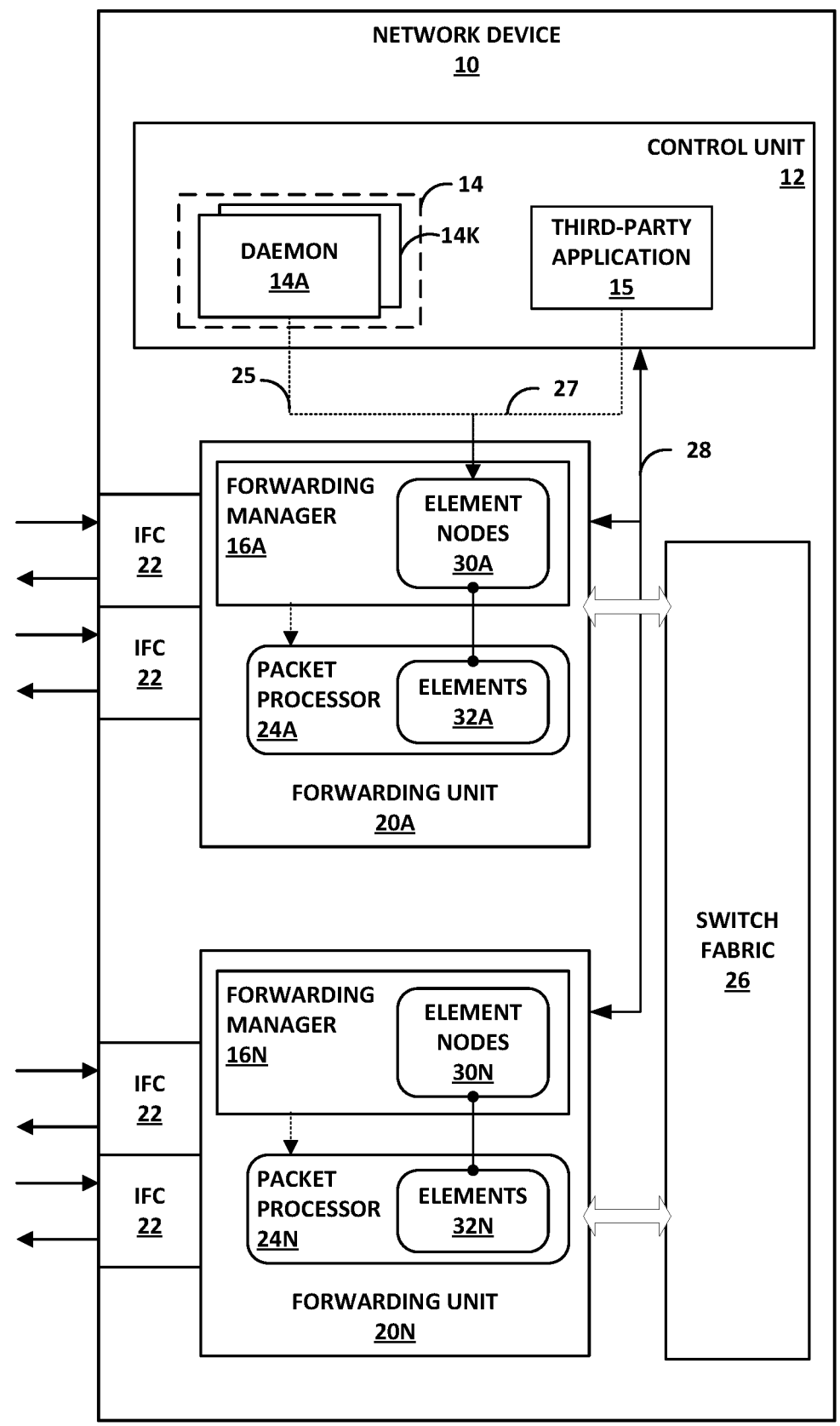
FIG. 1 is a block diagram illustrating an example network device in which one or more forwarding units are configured, according to techniques described herein.

FIG. 1 is a block diagram illustrating an example network device in which one or more forwarding units are configured, according to techniques described herein. Network device 10 may include a router such as a provider edge or customer edge router, a core router, or another type of network device, such as a switch. In this example, network device 10 includes a control unit 12 that provides control plane functionality for the device. Network device 10 also includes a plurality of forwarding units 20A-20N ("forwarding units 20") and a switch fabric 26 that together provide a data plane for processing network traffic. Forwarding units 20 receive and send data packets via interfaces of interface cards 22A-22N ("IFCs 22") each associated with a respective one of forwarding units 20. Each of forwarding units 20 and its associated ones of IFCs 22 may represent a separate line card insertable within a chassis (not shown) of network device 10. Example line cards include flexible programmable integrated circuit (PIC) concentrators (FPCs), dense port concentrators (DPCs), and modular port concentrators (MPCs). Each of IFCs 22 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of forwarding units 20 may include more or fewer IFCs. Switch fabric 26 provides a high-speed interconnect among forwarding units 20 for forwarding incoming data packets to an egress forwarding unit of forwarding units 20 for output over a network that includes network device 10.

Control unit 12 is connected to each of forwarding units 20 by internal communication links 28. Internal communication links 28 may include a 100 Mbps Ethernet connection, for instance. Control unit 12 configures, by sending instructions and other configuration data via internal communication link 28, forwarding units 20 to define packet processing operations applied to packets received by forwarding units 20.

Control unit 12 executes a plurality of applications, including daemons 14A-14K ("daemons 14") and one or more third-party applications 15. Each of the applications may represent a separate process managed by a control unit operating system. Daemons 14 may represent user-level processes that are developed and deployed by the manufacturer of the network device 10. As such, daemons 14 are "native" to the network device 10 in that the development of the applications is carefully managed by the manufacturer to facilitate secure, robust, and predictable operation of the network device 10, such operation defined at least in part according to a configuration specified by an operator (e.g., a service provider, enterprise, or other customer of the network device 10 manufacturer). Daemons 14 may run network management software, execute routing protocols to communicate with peer routing devices, maintain and update one or more routing tables, and create one or more forwarding tables for installation to forwarding units 20, among other functions.

Third-party application 15 represents an application. The "third-party" typically is an operator of the network device 10 and is not the manufacturer of the network device 10. However, application 15 need not necessarily be developed by a third party and may in some cases be, e.g., an application developed by the manufacturer of the network device 10. In some cases, third-party application 15 presents an external application programming interface (API) by which external controllers, such as software-defined networking controllers and network management systems, may send data representing packet processing operations to be performed by forwarding units 20. In such cases, third-party application 15 operates as an interface to the network device 10 data plane for the external controllers.

Control unit 12 may include one or more processors (not shown in FIG. 1) that execute software instructions, such as those used to define a software or computer program, stored to a computer-readable storage medium (again, not shown in FIG. 1), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 12 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each forwarding unit of forwarding units 20 includes at least one packet processor 24 that processes packets by performing a series of operations on each packet over respective internal packet forwarding paths as the packets traverse the internal architecture of network device 10. Packet processor 24A of forwarding unit 20A, for instance, includes one or more configurable hardware chips (e.g., a chipset) that, when configured by applications executing on control unit 12, define the operations to be performed by packets received by forwarding unit 20. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic. A single forwarding unit 20 may include one or more packet processors 24.

Operations may be performed, for example, on each packet by any of a corresponding ingress interface, an ingress forwarding unit 20, an egress forwarding unit 20, an egress interface or other components of network device 10 to which the packet is directed prior to egress, such as one or more service cards. Packet processors 24 process packets to identify packet properties and perform actions bound to the properties. Each of packet processors 24 includes forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. In one example, each of packet processors 24 arranges forwarding path elements as next hop data that can be chained together as a series of "hops" in a forwarding topology along an internal packet forwarding path for the network device. The result of packet processing determines the manner in which a packet is forwarded or otherwise processed by packet processors 24 of forwarding units 20 from its input interface on one of IFCs 22 to, at least in some cases, its output interface on one of IFCs 22.

In many instances, the forwarding path elements perform lookup operations, such as a tree (or trie) search, a table (or index) search, a filter determination and application, or a rate limiter determination and application. Lookup operations locate, within a lookup data structure (e.g., a lookup tree), an item that matches packet contents or another property of the packet or packet flow, such as the inbound interface of the packet.

Applications configured for execution by control unit 12 determine the packet processing operations to be applied to packets by packet processors 24. In the example network device of FIG. 1, applications include daemons 14 and third-party application 15. Applications configure the packet processors 24 to perform the packet processing operations by sending, to forwarding units 20, data representing the packet processing operations. Such data may include forwarding path elements representing high-level packet processing requirements (e.g., route lookup and filtering). Packet processing operations may include fundamental packet forwarding operations such as input packet processing, route lookup, and output packet processing, as well as service functions such as packet filtering or access control, statistical sampling, traffic policing, rate limiting, and accounting.

Forwarding units 20 include respective forwarding managers 16 that translate the data representing the packet processing operations received from applications into forwarding path elements 32 (which may include forwarding "next hops" and hereinafter referred to as forwarding path elements) that include instructions executable by respective packet processors 24 and stores the forwarding path elements 32 to memory of packet processors 24 (not shown in FIG. 1). Each of forwarding manager 16 may represent executable instructions, such as instructions for a process. Packet processors 24 execute the forwarding path elements 32 to process received packets to satisfy the high-level packet processing requirements provided by the application. In this way, the applications inject higher-level representations of routes and next-hops (operations) into the stream of configurable forwarding state that is stored by packet processors and that defines, at least in part, the packet processing operations for execution by packet processors 24. Because forwarding path elements 32 may resolve to other forwarding path elements 32, forwarding path elements 32 may be chained together to define a set of packet processing operations for a given packet and form a "forwarding path" for that packet. The set of forwarding path elements 32 and forwarding state for execution and use by packet processors 24 may therefore alternatively be referred to as the forwarding path or internal forwarding path for a given packet processor 24, forwarding unit 20, or the network device 12 as a whole.

In accordance with techniques described in this disclosure, forwarding managers 16 represent forwarding path elements 32 using corresponding element nodes 30 (hereinafter, nodes 30"). Hereinafter, the techniques are described with respect to forwarding unit 20A. Each node of nodes 30A is a data structure managed by forwarding manager 16A and represents a single forwarding path element 32A for execution by packet processor 24A. A forwarding path element may be of a type to perform a simple action (such as a counter or discard), a conditional, or a complex construct such as a table, tree, or lookup. Nevertheless, forwarding manager 16A uses node instances of the common node data structure to represent and refer to each of the forwarding path elements 32. Each node instance may have a type that corresponds to the type of forwarding path element (e.g., action, tree, etc.)

Each of nodes 30A includes a token that is a unique identifier for a corresponding forwarding path element 32A that uniquely identifies the node within a context for the corresponding forwarding path element 32. The unique identifier may be, e.g., a 64-bit or other n-bit integer value for the token.

Forwarding manager 16A creates dependencies between nodes by referencing the token for the next node in a forwarding topology. For example, forwarding manager 16A may specify a second, next forwarding path element for a first forwarding path element by adding the token of the second, next forwarding path element to a list of next forwarding path elements for the first forwarding path element. This inherent token referencing allows connections between nodes to be easily abstract and thus more readily manipulated, provides a consistent interface across process and memory boundaries within forwarding manager 16A, and may facilitate multi-threading. Token referencing among nodes 30A may in these ways present one or more advantages over pointer-based schemes in which each forwarding path element is represented and referred to by its location in packet processor 24A memory.

Each node of nodes 30A can have dependencies, which are other nodes 30A that are referred to by the unique tokens of the other nodes 30A. Such dependencies may include not only the next forwarding path elements for the node but also include dependencies that notify forwarding manager 16A that a change in one node or entry may require another node to be updated.

Figure 2:
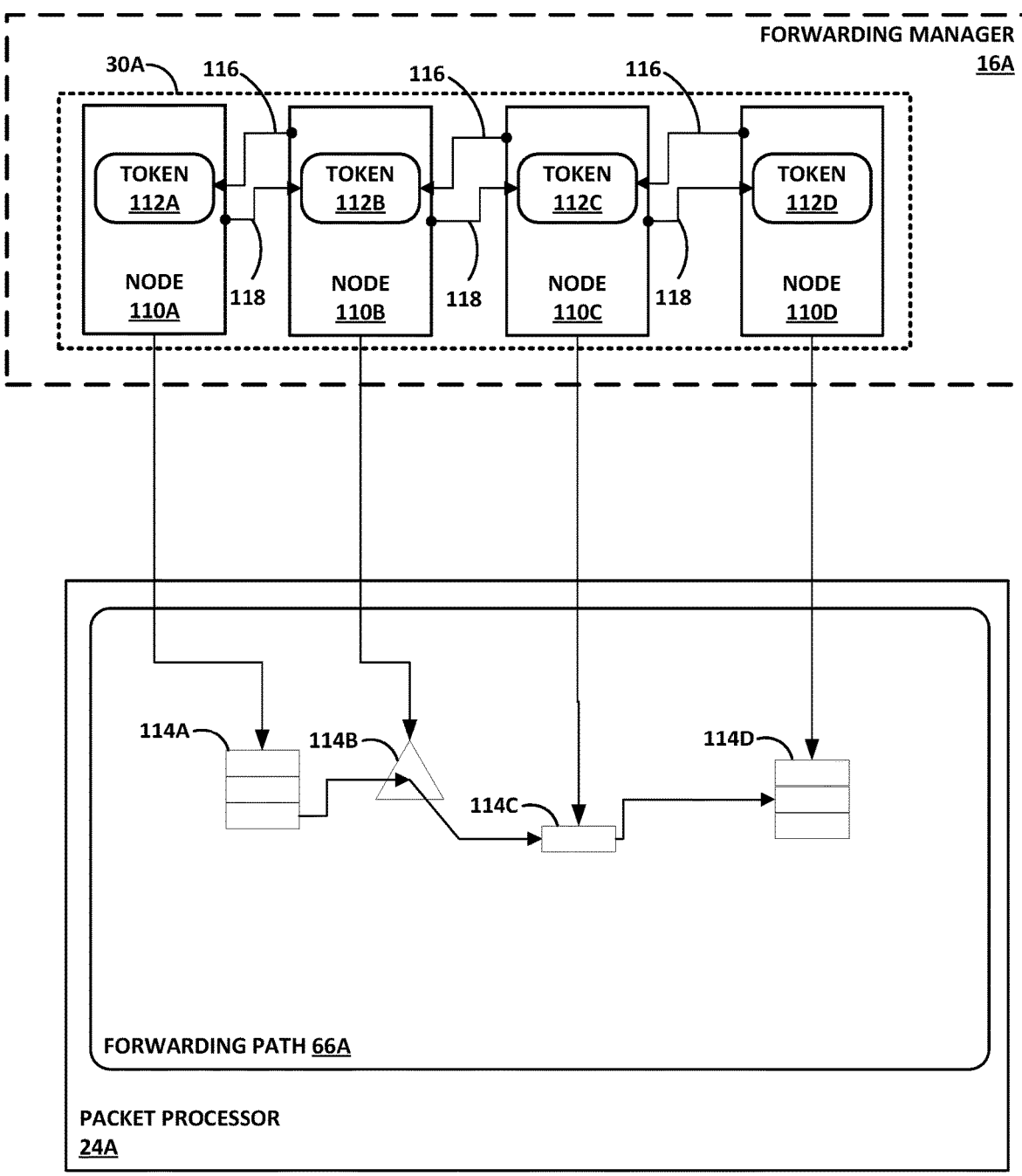
FIG. 2 is a block diagram illustrating, in further detail, a packet processor and a forwarding manager for a packet processor, according to techniques of this disclosure.

FIG. 2 is a block diagram illustrating, in further detail, a packet processor and a forwarding manager for a packet processor, according to techniques of this disclosure. Packet processor 24A includes a forwarding path 66A having forwarding path elements 114A-114D. For illustration purposes, a limited number of forwarding path elements 114 are shown in a simplified topology. Other instances of forwarding path 66A may include many thousands of forwarding path elements connected in complex topologies. Additional details of forwarding path 66A are included below with respect to FIG. 3.

Forwarding path elements 114A, 114B, and 114D represent forwarding path elements that are lookup containers, such as tables or trees. Lookup containers are configured with one or more entries that are the individual match elements for the containers. An entry may be identified by its parent container forwarding path element 114, a unique key for matching the lookup item, and a node token 112 that identifies the subsequent node 110 to execute on a successful match of the unique key to the lookup item (e.g., a packet field or interface). For example, an entry in a lookup tree 114C may have a unique key that matches to a packet field and refer to a node 110 that represents a counter-type forwarding path element 114C. Forwarding manager 16A configures forwarding path 66A such that a packet processing using lookup tree 114C having a packet field value that matches the unique key is subsequently processed using forwarding path element 114C.

Nodes 110A-110D represent example instances of nodes 30A. Each of nodes 110 represents a corresponding one of forwarding path elements 114 and is usable by forwarding manager 16A for manipulating, referencing, and configuring forwarding path 66A with the corresponding forwarding path element 114. Each of nodes 110 include a corresponding token 112. For example, node 110A includes token 112A, node 110B includes token 11B, and so forth. Forwarding manager 16A uses tokens 112 to create connection among nodes 110 by modifying any node 110 to specify a token 112 of another node 110. Each node of node 110 may include a list of token references for one or more other nodes 110 that represent forward or reverse dependencies of the node. In some example implementations, forwarding manager 16A includes a separate data structure to store token references for nodes 110.

Nodes 110 may include forward token references 118 and reverse token references 116 to tokens 112 of other nodes 110. In the illustrated example, for instance, node 110B includes a forward token reference 118 to token 112C of node 110C. Node 110C includes a reverse token reference 116 to token 112B of node 110B. Forward token references 118 may be a token value specified for an entry of a forwarding path element. For instance, forward token reference 118 from node 110B to node 110C may be a token value for an entry of the forwarding path element 114B. Based on this forward token reference 118, forwarding manager 16A configures forwarding path 66A to connect forwarding path element 114B to forwarding path element 114C in a forwarding topology of forwarding path 66A. Forwarding manager 16A may use forward token references 118 and reverse token references 116 to generate a dependency structure, e.g., one or more graphs usable by forwarding manager 16A to update forwarding path elements if a node referenced by the forwarding path element is modified, as described in further detail below.

Figure 3:
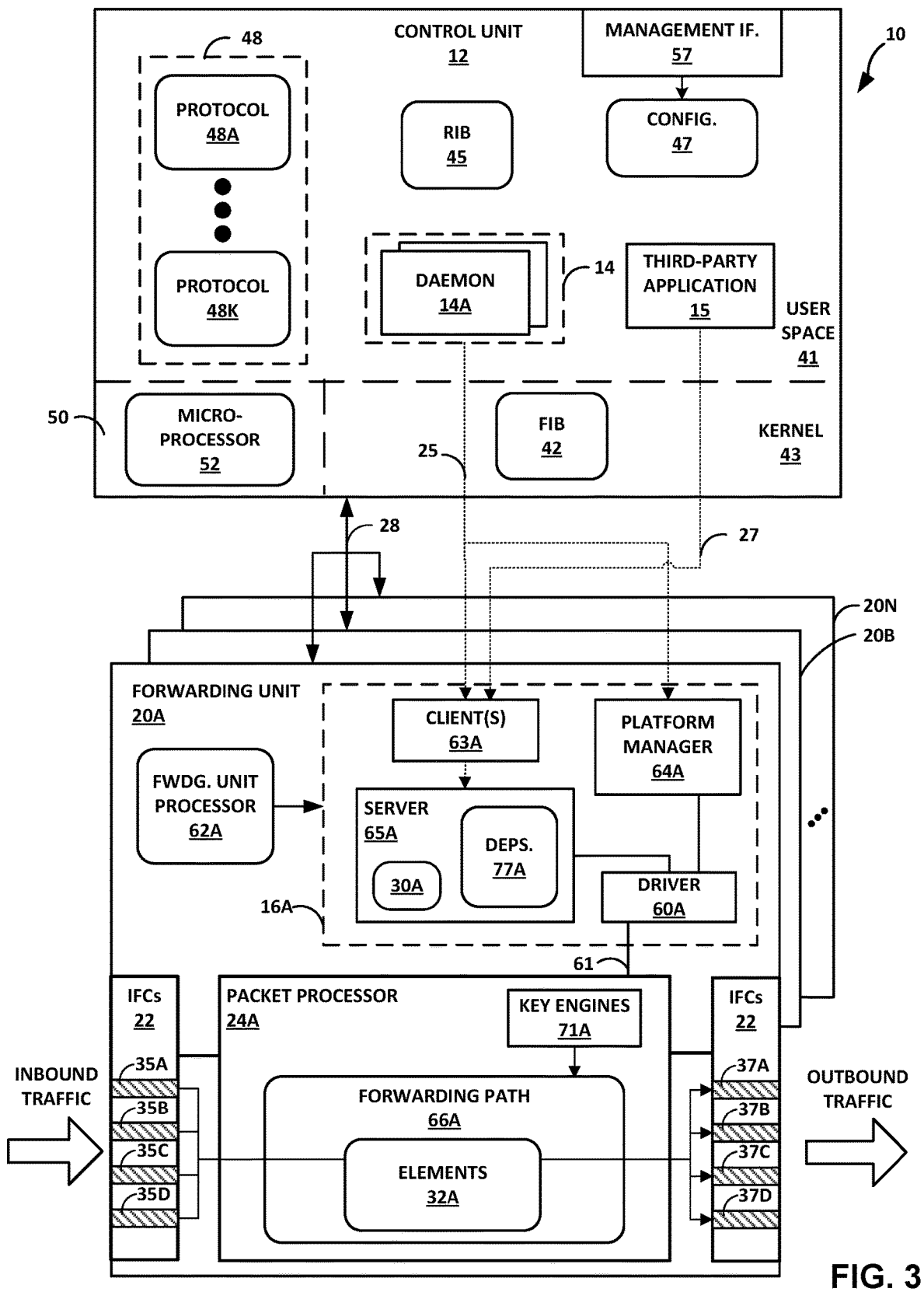
FIG. 3 is a block diagram illustrating, in further detail, an example network device in which a forwarding unit is configured, according to techniques described herein.

FIG. 3 is a block diagram illustrating, in further detail, an example network device in which a forwarding unit is configured, according to techniques described herein. Network device 10 illustrated in FIG. 3 may represent an example instance of network device 10 of FIG. 1.

In this example, control unit 12 includes a combination of hardware and software that provides a control plane operating environment for execution of various user-level host applications executing in user space 41. By way of example, host applications may include a management interface process 57 having a command-line interface and/or graphical user interface process to receive and respond to administrative directives, a routing protocol process of daemons 14 to execute one or more routing protocols of protocols 48A-48K (collectively, "protocols 48"), a network management process of daemons 14 to execute one or more network management protocols of protocols, an ARP process of daemons 14 to respond to ARP requests according the ARP protocol of protocols 48, a subscriber management process of daemons 14 to manage subscriber session setup and maintenance in accordance with one or more subscriber session management protocols (e.g., GPRS Tunneling Protocol-C (ontrol)), and so forth. In this respect, control unit 12 may provide routing plane, service plane, and management plane functionality for network device 10. Control units 12 may be distributed among multiple control units.

Daemons 14 and management interface 57 execute on and interact with kernel 43, which provides a run-time operating environment for user-level processes. Kernel 43 may represent, for example, a UNIX operating system derivative such as Linux or Berkeley Software Distribution (BSD). Kernel 43 offers libraries and drivers by which user-level processes may interact with the underlying system. Hardware environment 50 of control unit 12 includes microprocessor 52 that executes program instructions loaded into a main memory (not shown in FIG. 3) from a storage device (also not shown in FIG. 3) in order to execute the software stack, including both kernel 43 and user space 41, of control unit 12. Microprocessor 52 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, a routing protocol process of daemons 14 executes one or more interior and/or exterior routing protocols to exchange routing information with other network devices and store received routing information in routing information base 45 ("RIB 45"). RIB 45 may include information defining a topology of a network, including one or more routing tables and/or link-state databases. The routing protocol process resolves the topology defined by routing information in RIB 45 to select or determine one or more active routes through the network and then installs these routes to forwarding information base 42 ("FIB 42") of kernel 43. Typically, the routing protocol process generates FIB 42 in the form of a radix or other lookup tree to map packet information (e.g., header information having destination information and/or a label stack) to next hop devices and ultimately to interface ports of interface cards associated with respective forwarding units 20A-20N. Each of forwarding units 20 may be programmed with a different FIB.

Network device 10 also includes a plurality of forwarding units 20A-20N (collectively, "forwarding units 20") and a switch fabric (not shown) that together provide a data plane for forwarding network traffic. Forwarding units 20 connect to control unit 12 in this example by communication links 23, which may represent an Ethernet network.

Each of forwarding units 20 may include substantially similar components performing substantially similar functionality, said components and functionality being described hereinafter primarily with respect to forwarding unit 20A illustrated in detail in FIG. 3. Forwarding unit 20A of FIG. 3 may illustrate, in further detail, an example of forwarding unit 20A of FIG. 1. Forwarding unit 20A receives and sends network packets via inbound interfaces 35 and outbound interfaces 37, respectively, of interface cards (IFCs) 22 of forwarding unit 20A. Forwarding unit 20A also includes packet processor 24A, which represents hardware or a combination of hardware and software that provide high-speed forwarding of network traffic. Likewise, forwarding unit 20B includes packet processor 24B, and so on. In some examples, one or more of forwarding units 20 may each include multiple packet processors substantially similar to packet processor 24A.

Each of IFCs 22 may include interfaces for various combinations of layer two (L2) technologies, including Ethernet, Gigabit Ethernet (GigE), and Synchronous Optical Networking (SONET) interfaces. In various aspects, each of forwarding units 20 may include more or fewer IFCs. In some examples, each of packet processors 24 is associated with different IFCs of the forwarding unit on which the packet processor is located. The switch fabric (again, not shown in FIG. 3) connecting forwarding units 20 provides a high-speed interconnect for forwarding incoming transit network packets to the selected one of forwarding units 20 for output over one of IFCs 22.

Network device 10 may in some instances represent a multi-chassis router, and the switch fabric may include a multi-stage switch fabric, such as a 3-stage Clos switch fabric, that relays packet-switched communications and circuit-switched communications between the routing nodes of the multi-chassis router via optical interconnects using multiplexed communications. Such a multi-chassis router that employs optical interconnects using multiplexed communications is described in U.S. Publication No. 2008/0044181, entitled MULTI-CHASSIS ROUTER WITH MULTIPLEXED OPTICAL INTERCONNECTS, filed on Aug. 1, 2007, the entire contents of which are incorporated by reference herein.

Forwarding units 20A-20N of network device 10 demarcate control plane and data plane of network device 10. That is, forwarding unit 20A performs control plane and data plane functionality. In general, packet processor 24A and IFCs 22 implement a data plane for forwarding unit 20A, while forwarding unit processor 62A (illustrated as "fwdg. unit processor 62A") executes software including forwarding manager 16A and packet processor driver 60A that implement portions of the network device 10 control plane within forwarding unit 20A. Control unit 12 also implements portions of the control plane of network device 10. Forwarding unit processor 62A of forwarding unit 20A manages packet processor 24A and executes instructions to provide interfaces to control unit 12 and handle host-bound or other local network packets (such as packets that include Options Field values or TTL-expired packets). Forwarding unit processor 62A may execute a microkernel for forwarding unit 20A. The microkernel executed by forwarding unit processor 62A may provide a multi-threaded execution environment for executing modules of forwarding manager 16A and packet processor driver 60.

Packet processor 24A may include programmable ASIC-based, FPGA-based, or other types of packet processors that process network packets by performing a series of operations on each packet over respective internal packet forwarding paths as the packets traverse the internal architecture of network device 10. Packet processor 24A includes forwarding path elements 32A that, in general, when executed, examine the contents of each packet (or another packet property, e.g., incoming interface) and on that basis make forwarding decisions, apply filters, and/or perform accounting, management, traffic analysis, and load balancing, for example. In one example, packet processor 24A arranges forwarding path elements as next hop data that can be chained together as a series of "next hops" along an internal packet forwarding path 66A ("forwarding path 66A") for the packet processor 24A. The result of packet processing determines the manner in which a packet is forwarded or otherwise processed by packet processors 24 of forwarding units 20 from the packet's input interface on an ingress forwarding unit of forwarding units 20 to its output interface on an egress forwarding unit of forwarding units 20.

Packet processor 24A identifies packet properties and performs actions bound to the properties. One or more key engines 71A of packet processor 24A execute microcode (or "microinstructions") of the forwarding path elements to control and apply fixed hardware components of the forwarding path to process packet "keys." A packet key includes packet fields and other parameters that determine a flow of packet processing for the packet along an internal forwarding path. Internal forwarding path 66A ("forwarding path 66A") may represent a computer-readable storage medium, such as random access memory, and includes forwarding path elements in the form of programmable, executable microcode and fixed hardware components that determine the packet processing actions and other operations performed by packet processor 24A. Forwarding path 66A may include, for example, executable instructions, programmable logic, and application-specific logic that perform lookups, rate limit packet flows (e.g., using policers), and manipulate packet keys, among other functions. Forwarding path elements may include primitives such as lookup tables and lookup trees, along with rate limiters, policers, counters, firewalls, and other elements.

Internal forwarding paths of network device 10 may include combinations of respective forwarding paths 66 of multiple different packet processors 24. In other words, forwarding path 66A of packet processor 24A may include only a part of the overall internal forwarding path of network device 10. Control unit 12 may configure forwarding path 66A of packet processor 24A to identify host-bound network packets and forward such packets toward control unit 12. For example, control unit 12 may program filters that include a network address of a network device 10 and direct packet processor 24A to forward network packets having a destination address that matches the network address toward control unit 12.

In some examples, packet processor 24A binds actions to be performed on packets received by the packet processor 24A to identification of one or more properties of the packets. That is, upon identifying certain packet properties, packet processor 24A performs the action bound to the properties. Packet properties may include packet metadata such as a particular packet's ingress interface or egress interface (as determined by the packet processors 24) as well as information carried by the packet and packet header, such as packet header fields, destination route prefixes, layer four (L4) or Transport Layer protocol destination ports, and the packet payload. Actions bound to packet characteristics may include count, discard, forward to a specified forwarding path element or interface, filter, sample, rate limit, and Quality of Service (QoS) marking, differential services (DiffServ), load balance, intrusion detection and prevention, L2 class of service (CoS), and L2 or L2 Virtual Private Network (L2VPN) switching.

Each of key engines 71A includes one or more key buffers to store packet field data for corresponding packets that the key engine is currently processing. Key buffers may also provide limited writable memory to which elements of the internal forwarding path may write to pass messages accessible by future elements.

Forwarding path elements 32A (also referred to as "primitives") of forwarding path 66A include data structures having entries, or "items," that correspond to packet key values and bind the values to actions to be performed by key engines 71A executing forwarding path 66A. In this respect, at least some of forwarding path elements 32A represent a tightly-coupled combination of executable instructions that correspond to bound actions and of data for possible packet key values. A tree lookup one of forwarding path elements 32A may perform a longest-match prefix lookup in a routing table or search a list of prefixes in a filter program. A table lookup one of forwarding path elements 32A may determine whether another one of forwarding path elements 32A should be performed by key engines 71A. For example, a key engine 71A may perform a table lookup of packet properties to determine that key engines 71A should further perform a tree lookup to identify an outbound interface for the packet. Packet processor 24A may store forwarding path elements 32A in computer-readable storage media, such as static random access memory (SRAM). While illustrated within packet processor 24A, forwarding path elements 32A may be stored in memory external and accessible to packet processor 24A.

In some aspects, actions of forwarding path 66 use a forwarding path element data structure to initiate processing. At the end of each processing step by one of key engines 71A, such as execution of one of a forwarding path element 32A, the result is a forwarding path element that may specify additional processing or the termination of processing, for instance. In addition, forwarding path elements may specify or otherwise represent one or more functions to be executed by key engines 71A. Example forwarding path element functions include policing (i.e., rate limiting), counting, and sampling. Forwarding path elements thus form the primary data structure that can be used to initiate a lookup or another forwarding path element, chain lookups and forwarding path elements together to allow for multiple lookup and other operations to be performed on a single packet, and terminate a lookup. Key engines 71 may be associated with respective result (or "lookup") buffers that store results for executing forwarding path elements. For example, a key engine 71 may execute a lookup specified by a forwarding path element and store the result of the lookup to the associated result buffer. The contents of a result buffer may affect the actions of the forwarding path element in the forwarding topology.

Additional information regarding forwarding path elements (next hops) and forwarding path element (next hop) chaining is available in PLATFORM-INDEPENDENT CONTROL PLANE AND LOWER-LEVEL DERIVATION OF FORWARDING PATH ELEMENTS, U.S. application Ser. No. 12/266,298, filed Nov. 6, 2008, which is incorporated herein by reference in its entirety. Example details of a network router in which a control plane programs a forwarding plane with forwarding path elements are described in U.S. patent application Ser. No. 13/194,571, filed Jul. 29, 2011, and entitled PACKET FORWARDING PATH PROGRAMMING USING A HIGH-LEVEL DESCRIPTION LANGUAGE; and in U.S. Pat. No. 7,215,637, issued May 8, 2007, and entitled SYSTEMS AND METHODS FOR PROCESSING PACKETS, the entire contents of each of which are incorporated herein by reference.

Forwarding unit 20A receives inbound network traffic by IFCs 22, and packet processor 24A processes network traffic using internal forwarding path 66A. Packet processor 24A looks up outbound interfaces for and forwards transit network packets that are neither host-bound nor otherwise require a response of logical decision by the control plane as outbound traffic via outbound interfaces 37. Although described primarily with respect to a single packet processor 24A and a single forwarding path 66A, forwarding manager 16A for forwarding unit 20A may configure multiple packet processors 24 each having a separate and/or shared forwarding path 66.

Forwarding unit 20A executes forwarding manager 16A software and presents interfaces to control unit 12 for configuring forwarding path 66A. One or more clients 63A, server module ("server") 65A, platform manager 64A, and driver 60A may represent different processes executed by forwarding unit processor 62A using, e.g., an operating environment provided by a microkernel (not shown). Server 65A may be multi-threaded to concurrently support communication with multiple clients 63A. Each of clients 63A may communicate with one thread of server 65A to facilitate all operations specified to that client 63A/thread are executed in a sequence.

Server 65A presents an application programming interface (API) to enable clients 63A to create forwarding path elements 32A in forwarding path 66A by creating, referencing, and connecting forwarding path elements 32A using nodes 30A. Server 65A translates nodes 30A received from clients 63A into corresponding forwarding path elements 32A supported by packet processor 24A. Each of forwarding path elements 32A has a corresponding one of nodes 30A stored by server 65A and accessible using the server 65A API. Clients 63A use the API for nodes 30A to create sandboxes (described in further detail below), program entries into lookup-type forwarding path elements 32A, and connect forwarding path elements 32A to program end-to-end forwarding state.

In this way, server 65A implements a stateful translation bridge between clients 63A and the underlying hardware/forwarding path 66A of packet processor 24A. For example, clients 63A send a stream of nodes and entries and server 65A translates the nodes and entries into forwarding path elements 32A for configuring forwarding path 66A. Server 65A also includes data structures for tracking and managing nodes 30A received from the clients 63A, and in this way managing the overall forwarding state as represented in forwarding path 66A. One example such data structure of server 65A, dependencies 77A, is illustrated in FIG. 3.

Server 65A generates dependencies 77A using the list of token references of nodes 30A that specify dependencies for the nodes. For example, a client 63A may send server 65A a node X that includes forwarding state for an interface. Any node 30A that has a token reference in its list of token references to the token value for node X is dependent on node X. Server 65A represents dependencies in the dependencies 77A data structure, such as one or more trees, lists, tables, maps, etc., to enable server 65A to more readily and rapidly determine which nodes 30A (and corresponding forwarding path elements 32A) should be updated when another node is modified. Using the above example, dependencies 77A may include a map or other data structure that includes one or more mappings that map node X to all other nodes 30A that have the node X token value in their lists of token references. If node X is subsequently modified, server 65A maps node X to those nodes 30A that are dependent on node X using dependencies 77A and updates the forwarding path elements 32A for those nodes 30A. In this way, server 65A uses dependencies 77A to propagate changes made to a node 30A to the underlying forwarding topology of forwarding path 66A.

Packet processor driver 60A (hereinafter, "driver 60A"), configured for execution by forwarding unit processor 62A, configures forwarding path 66A with forwarding path elements 32A for execution by packet processor 24A. Packet processor driver 60A receives forwarding path elements 32A from server 65A and platform manager 64A. Forwarding path elements 32A may include instructions executable by packet processor 24A.

Clients 63A receive data 25, 27 from applications, the data 25, 27 representing packet processing operations, and translate data 25, 27 to nodes 30A that platform manager 64A and server 65A push to driver 60A to configure forwarding path 66A. Clients 63A may represent an interface adapter, e.g., a P4, OpenFlow, Switch Abstraction Interface (SAI), or other software-defined networking (SDN) protocol interface adapter that receives operations on the corresponding interface with a controller or the third-party application 15 and translates the operations to nodes 30A using the server 65A API. Clients 63A push nodes 30A to server 65A, which configures the corresponding forwarding path elements 32A in forwarding path 66A using driver 60A.

In some cases, client 63A may adjust a parameter (e.g., a policer parameter changed in the configuration) or change a dependency (e.g., point a route prefix to a different next hop) for a node. Server 65A may consider nodes and entries immutable (i.e., unchangeable) once configured in the forwarding path 66A. Accordingly, to change the node, client 63A inserts a new node with the same token value as the node being "modified." Server 65A receives the new node, deletes the forwarding path element corresponding to the old node from forwarding path 66A, inserts a new forwarding path element corresponding to the new node in forwarding path 66A, regenerates any underlying hardware state, and updates any dependencies in dependencies 77A and among forwarding path elements 32A. As a result of the server 65A providing this service, the client 63A need only insert the new, updated node.

Figure 4:
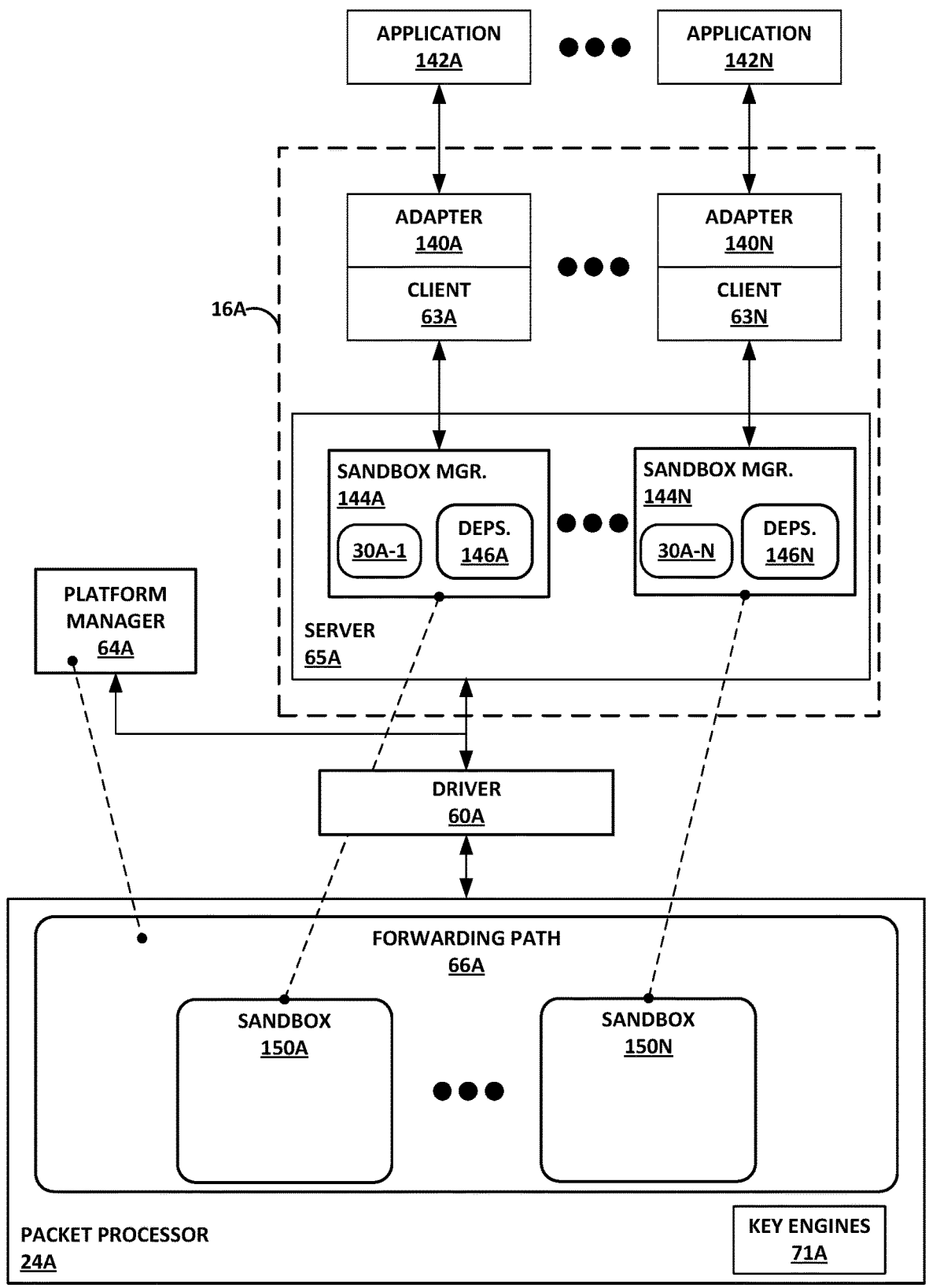
FIG. 4 is a block diagram illustrating selected components for example implementation of a network device, according to techniques described herein.

FIG. 4 is a block diagram illustrating selected components for example implementation of a network device, according to techniques described herein. In the example of FIG. 4, forwarding manager 16A and forwarding path 66A support multiple sandboxes 150A-150N for respective applications 142A-142N, which may represent any of daemons 14 or third-party application of FIG. 1. Sandboxes are described in U.S. patent application Ser. No. 14/944,113, filed Nov. 17, 2015, and entitled "Network Device Data Plane Sandboxes for Third-party Controlled Packet Forwarding Paths," which is incorporated by reference herein in its entirety.

Packet processors 24 may each be configured with one or more sandboxes 150. Each of packet processors 24 may facilitate similar and concurrent sandbox functionality with respect to the techniques of this disclosure, said functionality being described hereinafter primarily with respect to packet processor 24A.

Sandboxes 150 represent independent, parallel, and asynchronous forwarding path logic for packet processor 24A that is exposed for configuration by applications 142 via forwarding manager 16A. While the overall forwarding path for packet processor 24A is managed and configured by native applications, e.g., daemon 14, using platform manager 64A, the native applications may configure sandboxes 150 such that configuration of the sandbox forwarding logic within the overall forwarding path 66 is delegated to other applications 142.

Sandbox 150A, for instance, represents a container for instructions to be configured inline with other forwarding path elements of the internal forwarding path 66A for packet processor 24A. In some examples, sandbox 150A is a "logical" container in that instructions are "inside" sandbox 150A if configured by server 65A to be within sandbox 150A as part of the internal forwarding path for packet processor 24A. Sandbox 150A may in such examples present to the application 142A an independent, isolated, virtual packet processor within the packet processor 24A in such a way that the application 142A has control of operations performed by the sandbox 150A logic within the established confines of the sandbox 150A.

In other examples, sandbox 150A may represent a physically separate packet processor in the form of forwarding logic physically separate from the main packet processor 24A and from forwarding path 66A. In such examples, sandbox 150A may read instructions from a physically separate memory that defines the forwarding path for sandbox 150A. Sandbox 150A may in such examples present to the application 142A an independent, isolated, packet processor inline with the forwarding path 66A for the packet processor 24A in such a way that the third party has complete control of operations performed by the sandbox 150A logic within the physically separate confines of the sandbox 150A. Although described above with respect to sandbox 150A, other sandboxes 150 may be configured and operate similarly. Although forwarding path 66A is illustrated as being executed by packet processor 24A, multiple packet processors 24 may execute a common forwarding path or a forwarding path having forwarding path elements in common. The packet processors 24 may be located on a single line card.

In this example, each of applications 142 connects with and sends data representing packet processing operations to a corresponding one of adapters 140 of forwarding manager 16A. In this respect, forwarding manager 16A presents a sandbox interface. Adapter 140A, e.g., receives the packet processing operations from application 142A and translates the packet processing operations into nodes 30A-1. Likewise, adapter 140N receives the packet processing operations from application 142N and translates the packet processing operations into nodes 30A-N. Clients 63A-63N use the server 65A APIs to push nodes 30A-1-30A-N to server 65A and, more specifically, to respective sandbox managers 144A-144N. Clients 63 may by executed concurrently by respective threads to concurrently receive packet processing operations from applications 142.

Clients 63 may allocate memory and build nodes using the server 65A APIs, but clients 63 allocate nodes out of different memory zones. By exploiting the parallelism enabled by the node-based configuration scheme provided by server 65A, and because the clients 63 operate independently to configure respective sandboxes 150, the clients 63 are not dependent on each other and can run concurrently. Accordingly, each of clients 63 may communicate independently with a separate one of sandbox managers 144 that themselves can each execute by a different execution thread. As a result, server 65A allows for simultaneously configuring multiple sandboxes 150.

Sandbox managers 144 may be executed by different threads to independently manage nodes and dependencies for corresponding clients 63. For example, sandbox manager 144A receives node 30A-1 from client 63A and generates dependencies 146A, which may be similar to dependencies 77A of FIG. 3. Each of sandbox managers 144 manages a separate token space for tokens of the corresponding nodes 30A for the sandbox managers. For example, tokens for nodes 30A-1 may overlap with tokens for nodes 30A-N. Servers 65 may therefore operate to provide, to different applications 142, a consistent model for interacting with the underlying packet processor 24 hardware.

Figure 5:
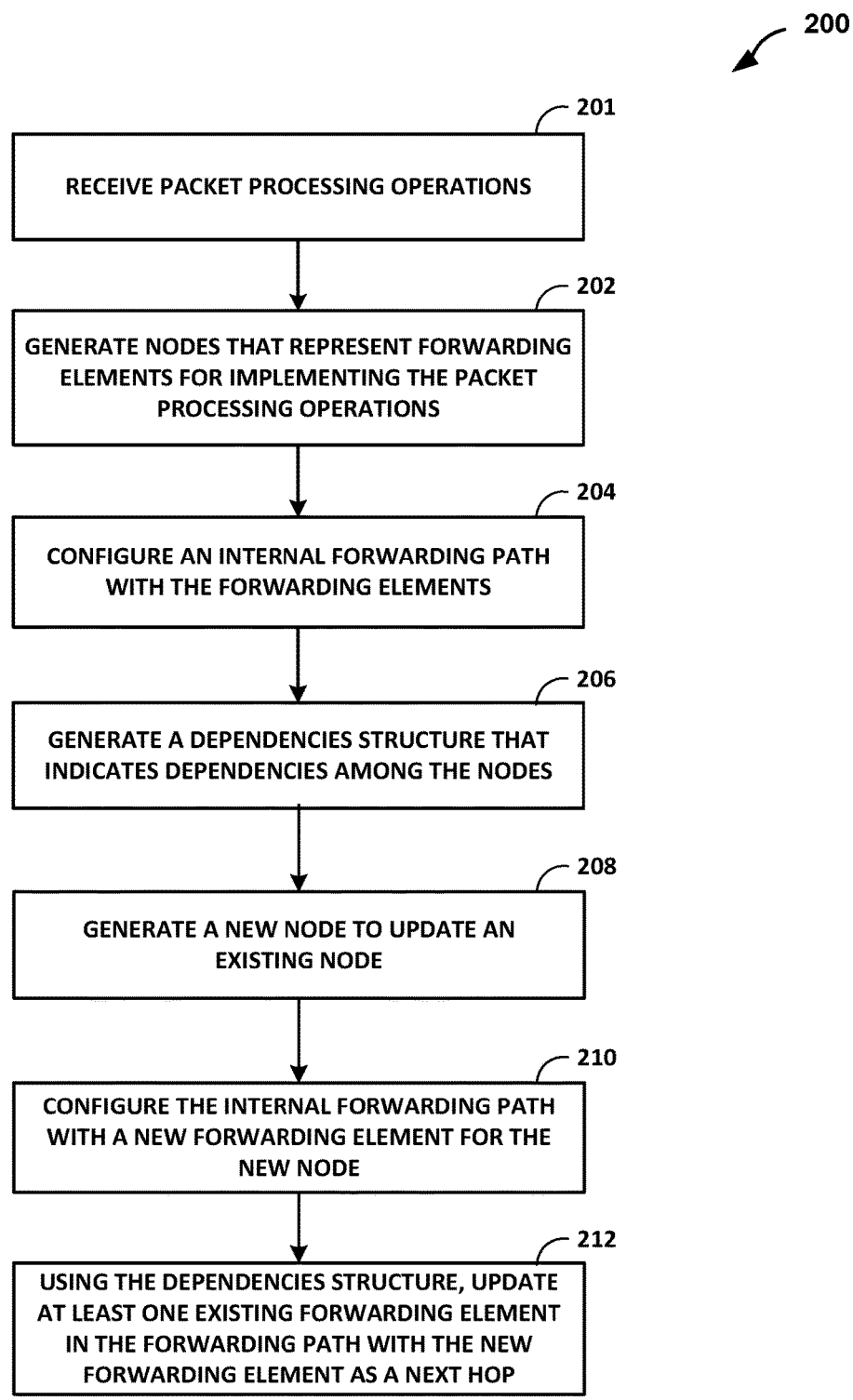
FIG. 5 is a flowchart illustrating an example mode of operation for a network device, in accordance with techniques described in this disclosure.

FIG. 5 is a flowchart illustrating an example mode of operation for a network device, in accordance with techniques described in this disclosure. Mode of operation 200 is described with respect to forwarding manager 16A of network device 10 of FIG. 1 but may be executed by any forwarding unit processor that executes instructions to configure at least one packet processor for a line card.

Forwarding manager 16A receives packet processing operations from at least one application executed by a control unit of the network device 10 (201). The forwarding manager 16A generates element nodes to represent forwarding path elements for implementing, in the forwarding plane of network device 10, the packet processing operations (202). For example, the forwarding manager 16A may include an adapter 140A that receives packet processing operations for an SDN protocol, such as OpenFlow, and translates the operations to nodes that may be generated and manipulated using an API presented by a server module 65A. For example, the forwarding manager 16A may set a token reference of a node to refer to the token of another node in order to create a connection between the nodes. The forwarding manager 16A uses the nodes to configure an internal forwarding path 66A for a packet processor 24A to include the forwarding path elements represented by the element nodes and to instantiate connections among the forwarding path represented by token references of the nodes (204).

In addition, forwarding manager 16A generates a dependencies structure that indicates dependencies among the nodes (206). For example, forwarding manager 16A may determine, from a token reference of a first node that includes a value of a token of a second node, that the first node depends on the second node. In response, forwarding manager 16A may update a dependencies structure with a mapping or other association from the second node to the first node to indicate that the first node depends on the second node.

Based on a new packet processing operation or new state data, forwarding manager 16A subsequently generates a new node to update an existing node (208). The forwarding manager 16A configures the forwarding path 66A with a new forwarding path element for the new node (210) and, using the previously-generated dependencies structure, updates at least one existing forwarding path element in the forwarding path 66A to set the new forwarding path element as a next hop of the at least one existing forwarding path element (212).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals or carrier waves, although the term "computer-readable media" may include transient media such as signals, in addition to physical storage media.

What is claimed is:

1. A method comprising:
receiving, by a forwarding manager for an internal forwarding path executed by at least one packet processor of a forwarding unit of a network device, one or more packet processing operations from a control unit of the network device;
generating, by the forwarding manager based on the one or more packet processing operations, a plurality of nodes each comprising a unique token, wherein a first node of the plurality of nodes represents a lookup-type forwarding path element and includes an entry having (1) a key for matching a lookup item for a packet and (2) a node token having a value for the token of a second node of the nodes;
configuring, by the forwarding manager based on the nodes, the forwarding path to include respective forwarding path elements for the plurality of nodes and to resolve the entry to the forwarding path element corresponding to the second node; and
processing, by the at least one packet processor, a packet received by the forwarding unit by matching a lookup item for a packet to the key of the entry of the first node and processing the packet with the forwarding path element corresponding to the second node.

2. The method of claim 1, wherein configuring the forwarding path to include respective forwarding path elements for the nodes comprises:
based at least on the entry, setting a next hop of a first forwarding path element corresponding to the first node to a second forwarding path element corresponding to the second node.

3. The method of claim 1, wherein the node token identifies the second node as a node to execute on a successful match of the key to the lookup item.

4. The method of claim 1, wherein the lookup-type forwarding path element comprises one of a lookup tree and a lookup table.

5. The method of claim 1, further comprising:
generating, by the forwarding manager, a dependencies structure that includes one or more dependencies that each indicates, for a particular node of the plurality of nodes, one or more other nodes of the plurality of nodes that include a token reference set to a value for the token of the particular node;
by the forwarding manager in response to receiving a subsequent packet processing operation, generating a new node to update the second node, the new node comprising a token set to the value for the token of the second node;
configuring the forwarding path to include a new forwarding path element corresponding to the new node; and
setting a next hop of a first forwarding path element corresponding to the first node to the new forwarding path element corresponding to the new node.

6. The method of claim 1,
wherein the forwarding manager comprises one or more clients to receive the packet processing operations and generate the plurality of nodes, and
wherein the forwarding manager comprises a server module that presents an application programming interface to receive the plurality of nodes from the one or more clients and, in response to receiving the plurality of nodes, configures the forwarding path with the respective forwarding path elements for the plurality of nodes.

7. The method of claim 6,
wherein the server module comprises respective sandbox managers for the one or more clients, and
wherein respective execution threads execute the respective sandbox managers for the one or more clients to concurrently configure respective sandboxes configured in the forwarding path.

8. The method of claim 7, wherein each of the sandboxes comprises a logical container for forwarding path elements to be configured inline within the forwarding path.

9. The method of claim 1, wherein each of the forwarding path elements comprises at least one instruction executable by the at least one packet processor.

10. The method of claim 1, wherein the forwarding unit comprises a line card insertable within a chassis of the network device.

11. A network device comprising:
a control unit configured to execute at least one application; and
a forwarding unit comprising:
an interface card configured to receive packets;
at least one packet processor operably coupled to a memory;
an internal forwarding path, wherein at least a portion of the forwarding path is stored to the memory and is executable by the at least one packet processor;
a forwarding unit processor; and
a forwarding manager configured for execution by the forwarding unit processor,
wherein the forwarding manager is configured to receive one or more packet processing operations from the control unit,
wherein the forwarding manager is configured to generate, based on the one or more packet processing operations, a plurality of nodes each comprising a unique token, wherein a first node of the plurality of nodes represents a lookup-type forwarding path element and includes an entry having (1) a key for matching a lookup item for a packet and (2) a node token having a value for the token of a second node of the nodes,
wherein the forwarding manager is configured to configure the forwarding path to include respective forwarding path elements for the plurality of nodes and to resolve the entry to the forwarding path element corresponding to the second node, wherein the at least one packet processor is configured to process a packet received by the forwarding unit by matching a lookup item for a packet to the key of the entry of the first node and processing the packet with the forwarding path element corresponding to the second node.

12. The network device of claim 11, wherein to configure the forwarding path to include respective forwarding path elements for the nodes the forwarding manager is configured to:

based at least on the entry, set a next hop of a first forwarding path element corresponding to the first node to a second forwarding path element corresponding to the second node.

13. The network device of claim 11, wherein the node token identifies the second node as a node to execute on a successful match of the key to the lookup item.

14. The network device of claim 11, wherein the forwarding manager is configured to generate a dependencies structure that includes one or more dependencies that each indicates, for a particular node of the plurality of nodes, one or more other nodes of the plurality of nodes that include a token reference set to a value for the token of the particular node, wherein the forwarding manager is configured to, in response to receiving a subsequent packet processing operation, generate a new node to update the second node, the new node comprising a token set to the value for the token of the second node, wherein the forwarding manager is configured to configure the forwarding path to include a new forwarding path element corresponding to the new node, and wherein the forwarding manager is configured to set a next hop of a first forwarding path element corresponding to the first node to the new forwarding path element corresponding to the new node.

15. The network device of claim 1, wherein the forwarding manager comprises one or more clients configured to receive the packet processing operations and generate the plurality of nodes, and wherein the forwarding manager comprises a server module configured to present an application programming interface to receive the plurality of nodes from the one or more clients and, in response to receiving the plurality of nodes, configure the forwarding path with the respective forwarding path elements for the plurality of nodes.

16. The network device of claim 15, wherein the server module comprises respective sandbox managers for the one or more clients, and wherein respective execution threads are configured to execute the respective sandbox managers for the one or more clients to concurrently configure respective sandboxes configured in the forwarding path.

17. The network device of claim 16, wherein each of the sandboxes comprises a logical container for forwarding path elements to be configured inline within the forwarding path.

18. The network device of claim 11, wherein each of the forwarding path elements comprises at least one instruction executable by the at least one packet processor.

19. The network device of claim 11, wherein the forwarding unit comprises a line card insertable within a chassis of the network device.

20. A non-transitory computer-readable medium comprising instructions for causing one or more programmable processors and at least one packet processor of a forwarding unit of a network device to:

receive, by a forwarding manager for an internal forwarding path executed by at least one packet processor of a forwarding unit of a network device, one or more packet processing operations from a control unit of the network device;

generate, by the forwarding manager based on the one or more packet processing operations, a plurality of nodes each comprising a unique token, wherein a first node of the plurality of nodes represents a lookup-type forwarding path element and includes an entry having (1) a key for matching a lookup item for a packet and (2) a node token having a value for the token of a second node of the nodes;

configure, by the forwarding manager based on the nodes, the forwarding path to include respective forwarding path elements for the plurality of nodes and to resolve the entry to the forwarding path element corresponding to the second node; and process, by the at least one packet processor, a packet received by the forwarding unit by matching a lookup item for a packet to the key of the entry of the first node and processing the packet with the forwarding path element corresponding to the second node.

* * * * *